L. T. RASMUSSEN.
FURROW OPENER.
APPLICATION FILED FEB. 25, 1909.
942,282.
Patented Dec. 7, 1909.
2 SHEETS—SHEET 1.
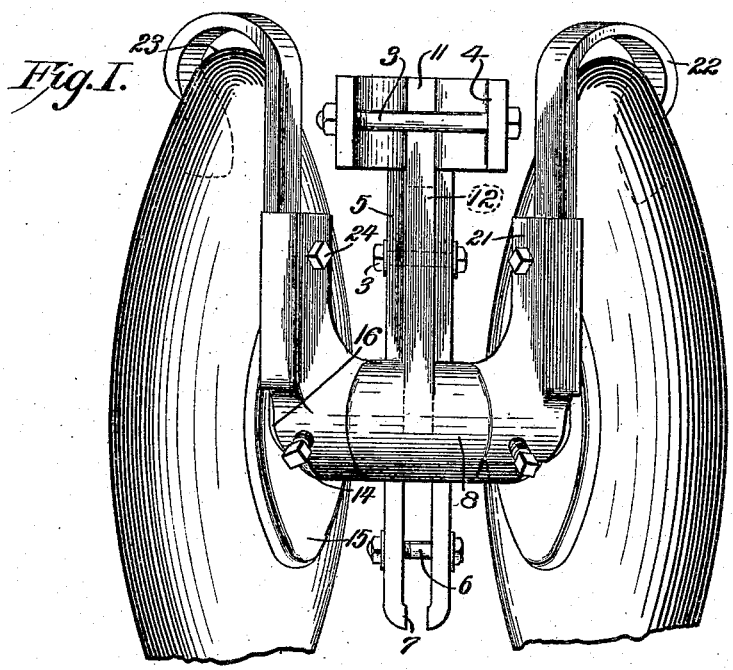
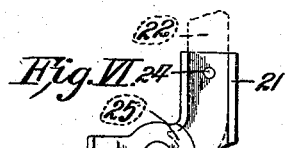
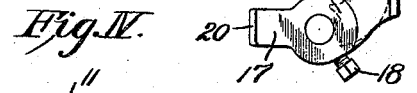
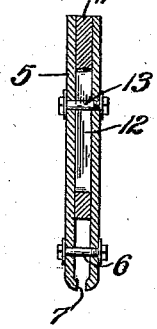
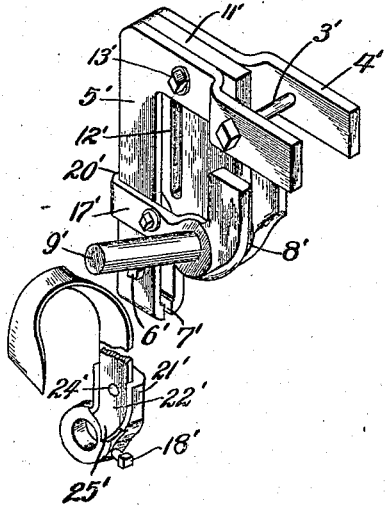
Witnesses,
E. A. Cahill
Myrtle M. Jackson
Inventor,
L. T. Rasmussen.
By Arthur C. Brown
Attorney.

L. T. RASMUSSEN.
FURROW OPENER.
APPLICATION FILED FEB. 25, 1909.
942,282.
Patented Dec. 7, 1909.
2 SHEETS—SHEET 2.
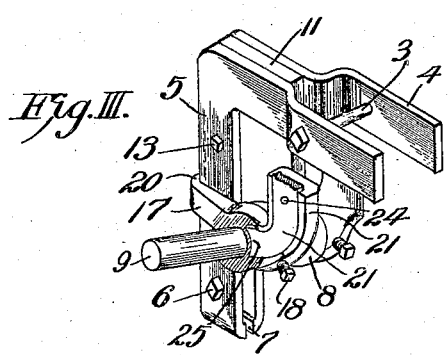
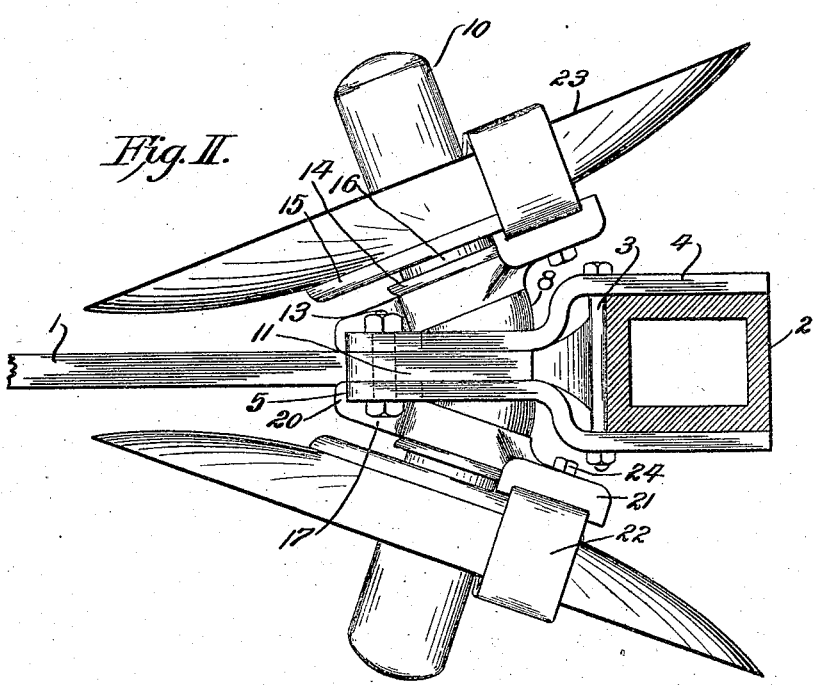
Witnesses.
E. H. Cahill.
Myrtle M. Jackson.
Inventor.
L. T. Rasmussen.
By Arthur C. Brown
Attorney.

UNITED STATES PATENT OFFICE.

LAURITS T. RASMUSSEN, OF COUNCIL BLUFFS, IOWA, ASSIGNOR TO WALKER MANUFACTURING COMPANY, OF COUNCIL BLUFFS, IOWA, A CORPORATION OF SOUTH DAKOTA.

FURROW-OPENER.

942,282.  Specification of Letters Patent.  Patented Dec. 7, 1909.

Application filed February 25, 1909. Serial No. 480,051.

*To all whom it may concern:*

Be it known that I, LAURITS T. RASMUSSEN, a citizen of the United States, residing at Council Bluffs, in the county of Pottawattamie and State of Iowa, have invented certain new and useful Improvements in Furrow-Openers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to furrow openers and more particularly to a device of that class which may be used in combination with planters of ordinary construction.

The principal object of my invention is to provide means for attaching the furrow opener to the planter and for adjusting same, relative to the planter shoe and seed tube.

A further object of my invention is to provide a furrow opener which is light, but durable, is economical in construction and simple in operation, and comprises the improved details of structure hereinafter described and illustrated in the accompanying drawings, in which:—

Figure I is a rear view of a furrow opener constructed according to my invention. Fig. II is a plan view of same in combination with a planter shoe and seed tube. Fig. III is a perspective view of the body portion of the opener, the disks and cleaner blades being removed. Fig. IV is a vertical sectional view of the attaching arms and adjusting standard. Fig. V is a view, in side elevation, of the adjusting standard and disk axle. Fig. VI is a similar view of the cleaner bracket. Fig. VII is a perspective view of a modified form of the attaching body.

Referring more in detail to the parts:— 1 designates a shoe and 2 the seed tube of a planter, the parts just named being of any ordinary and well known construction and in themselves forming no part of my invention.

Embracing the seed tube and preferably secured thereto, by a bolt 3, are the attaching arms 4 which extend forwardly from the tube and have depending portions 5 which extend over and are held in close frictional contact with the shoe 1 by means of a bolt 6; the lower ends of the depending portions 5 being preferably lipped at 7 in order that they may firmly grip the shoe body.

8 designates a head block, and 9 hub axles which extend laterally at a slight forward angle from said block and are adapted for carrying the disk hubs 10.

11 designates an adjusting standard which is preferably integral with the head block 8 and extends forwardly therefrom and is provided with a vertical slot 12, through which a bolt 13, that is carried by the attaching arms, may project, the standard 11 being preferably projected between the depending arm portions 5 and the bolt 13 located near the upper ends of said arm portions, as illustrated in the drawings. The disk hubs 10 are preferably provided with flanges 14 at their inner ends, and have disk flanges 15 outset a short distance from the flanges 14 to provide the peripheral grooves 16 therebetween, for a purpose presently set forth.

Adjustably mounted on the stub axles 9, between the hubs 10 and the head block 8, are the scraper brackets 17, each of which is preferably provided with a set screw 18, by which it may be fixed in a desired position on its axle, and with a forwardly projecting arm, having a hook 20 that is adapted to fit over the forward edge of the depending arm portion 5 to anchor the bracket against rocking movement on its axle.

At the back of the bracket 17 is a post 21 to which the scraper blade 22 is attached. Blade 22 extends upwardly from its post and is curved over the edge of the disk 23, so that its free end may turn inwardly at substantially the curvature of the disk, for the purpose of removing earth which may cling to the disk during the travel of the planter.

24 designates a screw bolt by which the cleaning blade is attached to its post, and 25 a lip on the lower end of such blade, that is adapted for projection into the groove 16 between the hub flanges 14 and 15 to hold the disk in its lateral adjustment, relative to the head block, without interfering with the revolution of the disk.

In Fig. VII I show a slightly modified form of the attaching standard and cleaner bracket. As shown, the bolt 3′ is arranged in the horizontal parts of the attaching arms 4', and the slot 12' in standard 11' positioned to receive the bolt 13'. The cleaner blade, instead of being attached to a part of bracket 17' is provided with a holder 21', recessed to receive it, the blade being secured thereto by a screw 24'. Holder 21' has an integral collar provided with a set-screw 18'. This collar fits over the stud 9' and is held in any desired position thereon by the set-screw.

In the modified form the reference numerals are given prime marks to distinguish same from the preferred form, while maintaining relative designations.

In using my device, the attaching arms are fixed permanently to the seed tube and shoe by tightening the bolts 3 and 6 to secure close frictional contact of the arms 4 and lips 7 with their respective mountings. With the attaching arms so arranged, the head block and standards 11 are adjusted to a desired vertical position and the bolts tightened to fix the parts firmly in combination, the bolt and slot union of the attaching arms and standard permitting such vertical adjustment. The disks are then adjusted on the stub axles 9 and the cleaner brackets fixed to the axles by means of their set screws, so that the lips 25 will retain the disks in their adjusted position.

Inasmuch as the operation of furrow openers is a well known art, I will not further describe same.

Having thus described my invention, what I claim as new therein and desire to secure by Letters-Patent is:—

1. In a furrow opener, an attaching mechanism comprising parallel arms, having depending portions, a head block having a slotted standard projected between the depending arms, a bolt carried by said arm portions and projected through the standard slot.

2. In a furrow opener, an attaching mechanism, a head block having a standard adapted for adjustable coöperation with said attaching mechanism, axles extending from said head block, disks carried by said axles, brackets carried by said axles, said brackets having lips adapted to overlie the attaching mechanism, and cleaner blades carried by said brackets.

3. In a furrow opener, a pair of vertically disposed, spaced attaching members, an axle-block having a reduced integral extension adapted to be clamped between said attaching members, disk axles carried by said block, scraper brackets mounted on said axles and provided with hooked ends engaging the attaching members, and scrapers secured to said brackets, substantially as set forth.

4. The combination with a planter shoe and seed tube, of arms embracing the seed tube and extending forwardly therefrom and having depending portions adapted for frictional contact with the planter shoe, means for tightening said arms against the seed tube and shoe, a head block having a slotted standard projected between said arms, a bolt connecting said arms and projecting through the standard slot, stub axles extending laterally from the head block, disks having hubs adapted for adjustment on said axles, and each provided with a groove at its inner end, brackets carried by said axles between the disk hubs and head block, set screws for fixing said brackets on their axles, arms projecting forwardly from said brackets and having lips engaging the forward edges of said attaching arms, posts at the rear of said brackets, and cleaner blades carried by said posts, each of said cleaner blades having a lip projected into the groove of the adjacent disk hub and a body portion overlying the adjacent disk, substantially as set forth.

5. The combination with a planter shoe and seed tube, of attaching arms embracing the seed tube and shoe and having bolts for tightening same thereagainst, a head block having a slotted standard projected between said arms, a bolt carried by said arms and extending through the standard slot, and whereby the attaching arms are united, axles extending laterally from the head block, disks having hubs adapted for horizontal adjustment on said axles and provided with grooves at their inner ends, brackets interposed between the disk hubs and head block, means for fixing said brackets in adjusted position, posts extending rearwardly and upwardly from said brackets, and cleaner blades removably mounted on said posts and having lip portions adapted for projection into the hub grooves, substantially as and for the purpose set forth.

In testimony whereof I affix my signature in presence of two witnesses.

LAURITS T. RASMUSSEN.

Witnesses:
W. I. WALKER,
G. F. SPOONER.